Patented Feb. 28, 1939

2,148,830

UNITED STATES PATENT OFFICE 2,148,830

METHOD OF MAKING RUBBER CHLORIDES

Clayton Olin North, Charleston, W. Va.; M. R. North, administratrix of estate of said Clayton Olin North, deceased, assignor to The Raolin Corporation, Charleston, W. Va., a corporation of West Virginia No Drawing. Application February 5, 1936, Serial No. 62,547

11 Claims. (Cl. 260—111)

This invention or discovery relates to improved methods of making rubber chloride; and it comprises a method of making homogeneously chlorinated rubber chloride of uniform character by chlorinating solutions of rubber in volatile organic solvents resistant to chlorine, wherein such solutions, prior to chlorination, are treated to remove the moisture and to uniformly and thoroughly disaggregate the rubber micelles in the presence of the solvent, advantageously by boiling the solutions under reflux until the moisture content and viscosity are reduced to a substantial minimum, the low viscosity, solutions of disaggregated rubber so obtained, being thereafter chlorinated to completion, being neutralized with a base and insoluble matters separated, and the solvent removed to recover a pure rubber chloride; and it further comprises said operations as steps in making varnish; all as more fully, hereinafter set forth and as claimed.

Rubber treated with chlorine takes it up in large amount; the amount being approximately twice the weight of the rubber itself. The rubber chloride resulting is a substance which has been known for very many years and is commercially made to some extent. In some of its properties, it is an extremely attractive material because of its chemical inertness and, when well made, because of its stability and permanence. As regards the latter consideration, much depends upon the particular way in which the chloride is made. Unstable byproducts may be formed in chlorination in greater or less amount.

Rubber chloride is soluble in carbon tetrachloride and some other chlorinated solvents and is also dissolved by various coal tar hydrocarbons, benzol, toluol, xylol and their mixtures. Rubber chloride is not soluble in or attacked by aqueous solutions, whether acid or alkaline, nor are most of the common organic liquids of the ketone and alcohol class solvents for it. A curious but important property is its lack of solubility in, or attackability by, petroleum hydrocarbons.

No commercial rubber is a pure material. Most of the raw rubbers contain more or less resin and few others are as pure or high grade as Ceylon crepe.

Another source of difficulty in making a standard high grade material is the internal structure of the rubber itself. Any rubber is made up of structural units or micelles. And in all methods of chlorinating rubber, it is the molecules on the outside of a micelle that chlorinate first. For example, in making a "solution" of rubber in carbon tetrachloride what is really obtained is a dispersion of rubber particles. They are greatly swollen, but they are still particles. In chlorinating such a suspension, there is always a possibility of under-chlorination of part of the particles and over-chlorination of other parts. The smaller the particle, the less is this source of difficulty. Chlorination of clean rubber under proper conditions is a smooth reaction, but impurities in any substantial amount may introduce side reactions.

In chlorination, the rubber takes up most of the chlorine by addition but some of it by substitution with a concomitant production of HCl. There is a tendency, however, as stated, toward production of unstable chlorinated byproducts. And if chlorination is not carried to completion, the product is apt to be a mixture of bodies of different degrees of chlorination and of quite different properties; particularly as regards solubility. Moisture in the system at the time of chlorination is undesirable.

One outstanding practical difficulty has been an undesirable increase in the viscosity of the solution during chlorination. As the viscosity increases, it becomes more difficult to pass chlorine gas into the solution; this being one of the reasons for the use of extremely dilute rubber solutions.

It has now been found that much of the difficulty disappears if the solution of rubber be given a preliminary disaggregating treatment and is substantially anhydrous prior to and during chlorination. In so doing, a substantially dry, non-aqueous organic system containing disaggregated rubber micelles is chlorinated without exhibiting any substantial increase in viscosity. Chlorination is effected hot and the solution remains sufficiently fluid to permit ready introduction of chlorine gas, and full, uniform chlorination of the rubber.

It is an object of this invention to produce a rubber choride with chlorination carried to completion and to recover a product substantially free of unstable bodies or byproducts; producing a standardized homogeneous material of standard properties, whatever variations there may be in the rubber treated.

In the practice of the present invention, a solution of rubber may be produced in any suitable chlorine-resistant solvent; usually carbon tetrachloride. In lieu of carbon tetrachloride, other chlorinated hydrocarbons, such as chlorethanes, chloroform, etc., may be employed. These are mobile, moderately volatile liquids resistant to chlorine. It is advantageous to uniformly plasticize the rubber by hot milling, in an ordinary way, prior to making the solution, swell up the rubber with part of the solvent and then disperse the swollen rubber in the remainder of the solvent. Hot milling of rubber, as the term is ordinarily used in the art, is milling at 80° C. or above until uniform plasticity is obtained. It is not desirable to overmill the rubber, but it is desirable to mill until a standardized material is obtained of uniform consistency. In producing the swollen rubber, the solvent may be introduced into the warm plastic rubber coming from the mill, using mixers equipped with suitable mixing blades or agitators. So far, the operation is much like that often used in making rubber cement. The following dispersion and dilution of the swollen rubber may also be effected in such mixers.

A solution of rubber so produced is then heated until the viscosity is reduced to a minimum; heating being under a reflux condenser adapted to retain and return volatilized solvent. To obtain the full reduction in viscosity desired, it is commonly necessary to heat under the reflux for a long time. During this operation, the solution is dried substantially, any traces of water present being evaporated. With much moisture in the rubber, it may be desirable to permit a slight but positive escape of mixed vapors of $H_2O$ and solvent from the condenser during the early stages of the heating. This heating gives a solution better adapted for the subsequent chlorination; the rubber micelles being disaggregated and the whole system dried to a substantial degree. Both actions are beneficial and cooperate in reducing viscosity.

By keeping the solution boiling under the reflux, the liquid becomes dry because of the escape of mixed vapors of $H_2O$ and solvent as an azeotropic mixture from the reflux condenser and becomes thinner; the viscosity goes down. There is, however, a limit to the reduction in viscosity and with good crepe rubber in carbon tetrachloride, heating at a boiling temperature longer than 48 hours does not effect a further reduction worth while. With some rubbers, boiling for considerably less than 48 hours effects a sufficient reduction. But a tolerably long period of boiling under reflux condenser is always required.

This boiling operation may be called depolymerization, although, probably, the actual rubber molecules are not depolymerized; what is accomplished is a disaggregation with reduction in the average particle size—by "particle" meaning the rubber micelles which are structural units in raw rubber and in hot milled rubber. The longer the heating, within limits, the less is the size of the particles of the suspensoid in the liquid; the original particles are disaggregated.

The boiling point of pure carbon tetrachloride is 76–77° C. and it is not materially affected by the rubber. The boiling point of commercial carbon tetrachloride may vary somewhat from this figure. On boiling the mixture, if there is much moisture in the system, there is, temporarily, a lowering due to the formation of an azeotropic vapor mixture. This vapor mixture will gradually escape beyond the reflux condenser in time, without any great escape of tetrachlorid vapor. But, as stated, if there is much moisture present, it is advantageous to permit a slight escape of mixed vapors in the early stages. When the temperature of the liquid rises to the normal boiling point, the system may be regarded as substantially dry.

By milling well and then disaggregating by long boiling under the conditions mentioned, there can be obtained solutions containing as high as 5 per cent of rubber thin enough to be readily chlorinated. But chlorination is still easier with weaker solutions, 2 or 3 per cent. With ordinary solutions of rubber in carbon tetrachlorid not treated as described, it is difficult to chlorinate a 2 or 3 per cent solution without the liquid stiffening and gelling. With the preliminary treatment and a dry liquid, chlorination in a 5 per cent solution can be carried on easily without stiffening or gelling during the chlorination. Agitation of the liquid is advisable. The more concentrated the solution, the more desirable is thorough agitation to prevent rubber adhering to the heating surface and avoid local overheating. Any efficient positive means of agitation may be employed to supplement the agitation inherent to boiling. One efficient means is continuously pumping the liquid into and out of the heating zone in cyclic circulation. This not only minimizes the danger of overheating but also facilitates production of uniform materials.

Chlorination may be in apparatus similar to that used for the preliminary treatment; chlorine being led into the liquid under a reflux. Heating is generally not necessary at first, since there is evolution of heat in chlorination. The upper limit of temperature is the boiling point of carbon tetrachloride or of the other chlorinated liquid used as a solvent. With a good reflux and a moderate rate of introduction of chlorine action is not violent and cooling of the system, beyond that given by the reflux condenser, is not necessary. Introduction of chlorine is continued until free chlorine escapes. Chlorination is facilitated by catalysts and by ultraviolet light. In methodical operation, a cyclic circulation of the liquid is often established past a quartz window or tube exposed to rays from an ultraviolet lamp. After chlorination, the liquid is boiled to free it of HCl and excess chlorine; these escaping past the reflux.

While it is possible to perform the preliminary boiling treatment and the chlorination in the same piece of apparatus as successive operations, it is in general better to separate the operations. This gives a better control and, moreover, chlorination is a more rapid operation than drying and disaggregation. It is advantageous to effect the preliminary treatment with relatively large batches and then withdraw successive smaller portions of the warm, thinly mobile solution for chlorination. In so doing, disaggregation may be made a more or less continuous operation. The warm solution coming from the boiling operation may be stored in heat insulated tanks pending chlorination. On chlorinating a warm solution the exothermic action quickly brings it to a boiling temperature.

In chlorination, the liquid is made anhydrous, if not already so, because of the escape beyond the condenser of HCl carrying vapors of water and of solvent with it. It is, however, as stated, better to have the system substantially dry at the time chlorine is introduced.

After chlorination, the liquid is acid because of the presence of some retained HCl as gas and it usually contains some chlorine. Most of the HCl produced by chemical actions leaves the system as gas. Efflux vapors from the reflux container are sent forward through another condenser. It is commonly desirable to continue the boiling for a short time after the introduction of gas is discontinued.

The liquid is at this time, as stated, somewhat acid. The exact acidity may be determined by titration of a sample. Lime, as fine sifted CaO, is then added in amount somewhat greater than corresponds to the acidity. The lime combines with the HCl and with the chlorine, forming compounds insoluble in dry carbon tetrachloride. Magnesia, calcium carbonate, etc., may be employed, but CaO is advantageous. With an excess of CaO, basic chlorides are formed which are easier to separate and the excess also acts as a collecting means in carrying down suspended solids. The clear liquid, decanted or otherwise separated from the solids, is then treated to remove the carbon tetrachloride and obtain the rubber chloride as a solid. This may be done in various ways. One way is to introduce the tetrachloride solution into boiling water, the tetrachloride and some water coming off as an azeotropic vapor mixture. Water containing some alcohol, either ethanol or methanol, is better. The physical state of the rubber chloride obtained depends on the way this removal of tetrachloride is effected. It is, in general, a loose, spongy mass which can be readily dried. After precipitating with water, or water containing alcohol, the precipitate is dried in a current of warm air.

An advantageous precipitant is a petroleum oil; one with a boiling point allowing fractionation of carbon tetrachloride (or the other chlorinated solvent). Commercial kerosene can be fractionated into liquids convenient for this purpose. As stated, rubber chloride is insoluble in petroleum hydrocarbons and an addition of kerosene to the solution separates it. One advantage of this procedure is that the rubber chloride contains no moisture and does not require the careful drying to remove the last traces of moisture incident to precipitation by water. Small traces of petroleum hydrocarbons left in the rubber chloride are not as disadvantageous as traces of moisture.

The dried rubber chloride can be made into a varnish base and into varnishes by the use of plasticizers and thinning solvents of the coal tar class. Turpentine may be used. Coating compositions may be made which can be applied to surfaces by brushing, spraying or any other usual ways. The dried coating resulting is not attacked by any of the ordinary acid or alkaline solutions, nor is it affected by most solvents of the alcohol or ketone class. It is, as stated, particularly resistant to petroleum oil.

This resistance to petroleum oils can be utilized in packaging lubricating oil, a rubber chloride coating being used on the two surfaces of a regenerated cellulose container.

In a practical embodiment of the present invention, raw rubber, as pale crepe or smoked sheets, is first milled upon an ordinary rubber mill (warm mixing rolls revolving at differential speeds) until a uniform plastic mass is obtained. The warmed plastic rubber is cut into fragments and these dissolved with carbon tetrachloride, or a like solvent, to make a liquid having the desired content of rubber; being generally first swollen with a portion of the solvent. Suitable proportions are 102 parts by weight of warm plastic rubber and 3000 parts by weight of tetrachloride. Solution should be effected in a vessel or mixer which can be closed. The warm rubber pieces are charged into the mixer and solvent added portionwise with good stirring. The rubber first swells and the swollen rubber is then dispersed in the solvent, giving a uniform rather viscous liquid. About 4 hours are required to obtain this viscous liquid having a viscosity of about 18 seconds. That is, a sample of the liquid cooled to 20° C. generally displays a viscosity of 18 seconds as determined by an ordinary method, using a modification of the "Ford cup". The apparatus includes a glass pipette with a ⅝ inch bore and 3 inches long with a discharge orifice 3/32 inch in diameter. When filled to a mark indicating 12.5 cc. capacity, water will run out in 2⅗ seconds. This uniform viscous liquid is suitable for the next operation.

The liquid is then heated under reflux at the boiling temperature until the initial viscosity decreases substantially and reaches a minimum. As stated ante, during this time any traces of water which are present are evaporated.

A liquid thus treated can be readily and effectively chlorinated. Chlorination is effected by passing a current of chlorine through the liquid at a boiling temperature while refluxing the vaporized solvent until the greenish yellow color of chlorine gas appears above the liquid. During this operation, the reflux condenser is so operated that the carbon tetrachloride is condensed and returned, while most of the HCl gas evolved is carried forward to a second condensing system and recovered. Carbon tetrachloride carried forward and condensed, is collected and can be returned. As stated, chlorination is carried forward until the greenish yellow color of chlorine appears. Another indication of the end of the operation is a drop in the temperature. Chlorination, as stated, evolves heat.

About 6 hours are generally required for chlorination. The liquid solution of rubber chloride obtained after cooling to room temperature exhibits a viscosity of about 5 seconds. It is still somewhat acid.

In neutralizing, an excess of powdered lime, CaO, is added. With the stated charge, the addition is often 16 parts of ordinary dry fine lime. The lime is stirred into the solution and stirring is continued until neutrality is obtained; a matter of some time. The liquid is then filtered or passed into a centrifugal in any ordinary way to separate solids.

It is advantageous to agitate the mixture of lime and solution at, or near, the boiling temperature, say, for about two hours and then filter-press, using filter cloths coated with infusorial earth or other "filter aid"; the filter pressing being effected under pressure.

After clarification, the clear liquid is precipitated in one of the ways described: by boiling water, alcohol, or a petroleum oil, the rubber chloride being then drained and dried. Except for differences in temperature, the operation as so far described is quite the same where chloroform, or other chlorinated hydrocarbon is used in lieu of carbon tetrachloride.

The dry rubber chloride is applicable to the ordinary and known uses of rubber chloride. Among other things, it can be dissolved in appropriate solvents to give coating compositions. Rubber chloride is, as stated, soluble in but few liquids, a fact to which it owes much of its value as a coating material. But it is soluble in carbon tetrachloride, chlorethane and some other chlorinated hydrocarbons, and in the various coal tar oils, benzol, toluol, xylol, etc. The coal tar oils are the usual solvents in making varnishes, lacquers and enamels. The varnishes do not tolerate any great amount of thinner of a petroleum nature, "turpentine substitute", etc., but minor amounts may be used. Rubber chloride itself being a friable, brittle solid, it is usual to add a plasticizer of some type to this varnish solution, in order to obviate brittleness in the films. This use of plasticizers in the preparation of rubber chloride varnishes is described and claimed in a copending application.

In making varnishes or other rubber chloride compositions, rubber chloride from any source, including the commercial varieties heretofore available, may be used with the incorporation of suitable plasticizers, solvents, etc. However, in all such compositions the rubber chloride made by the method described hereinabove is particularly desirable. It is a standardized material, free of unstable byproducts, and the viscosity relations of the solution are satisfactory.

What is claimed is:

1. As an improvement in the manufacture of rubber chloride the steps which comprise preparing a solution of rubber in a non-aqueous solvent, said solution having a relatively high viscosity, heating the solution to boiling, continuing the boiling of said solution under reflux until the viscosity is substantially reduced and thereafter introducing chlorine into the hot, low viscosity solution to chlorinate the dissolved rubber.

2. The process of claim 1 wherein the refluxing during said boiling under reflux is so controlled as to permit a minor escape of vapors of the non-aqueous liquid to carry out the vapors of water, thus simultaneously drying said solution and lowering the viscosity thereof.

3. In the manufacture of rubber chloride the process which comprises milling rubber to plasticity, dissolving the milled rubber in a non-aqueous solvent resistant to chlorine, heating said solution to boiling and continuing the boiling under reflux until a substantial reduction in viscosity is obtained and thereafter chlorinating the so boiled solution by introducing gaseous chlorine.

4. In the manufacture of rubber chloride the process which comprises milling rubber to plasticity, dissolving the milled rubber in a non-aqueous solvent resistant to chlorine, boiling the solution under a reflux condenser open to air until the viscosity ceases to diminish, chlorinating the boiled solution by introducing gaseous chlorine and precipitating the rubber chloride by adding a non-solvent therefor.

5. The process of claim 4 wherein the non-solvent is water.

6. The process of claim 4 wherein the non-solvent is an alcoholic liquid.

7. The process of claim 4 wherein the non-solvent is a petroleum oil.

8. An improved method of making rubber chloride, which comprises preparing a solution of rubber in an organic solvent resistant to chlorine, heating the solution under a reflux condenser open to atmosphere until it is substantially dry and its viscosity is reduced to a minimum, introducing chlorine into the solution of reduced viscosity while still hot and continuing the chlorination until rubber is chlorinated and substantial amounts of chlorine appear in the evolved vapors, stopping the introduction of chlorine, continuing the heating while removing hydrochloric acid and excess chlorine and then recovering the rubber chloride by removing residual impurities and solvent.

9. The process of claim 8 wherein the solution of rubber chloride freed of excess chlorine is cooled, a dry insoluble neutralizing agent capable of forming insoluble chlorides is added, the mixture is warmed and agitated, the insoluble neutralization and other products are removed by filtration, the filtrate is introduced into a boiling aqueous solution and the mixture is agitated until the rubber chloride is precipitated substantially free of impurities, the solvent being distilled off and the water soluble bodies being extracted, and finally separating and drying the fluffy rubber chloride so obtained.

10. The process of claim 8 wherein chlorine is introduced into the hot, so treated solution and the solution is maintained at a minimum viscosity and moisture content during the chlorination operation by maintaining said solution at approximately boiling temperature, thus automatically controlling the reaction.

11. In the manufacture of rubber chloride, the process which comprises preparing a solution of rubber in a non-aqueous solvent resistant to chlorine, boiling the solution under a reflux condenser open to the atmosphere until the viscosity substantially ceases to diminish, and chlorinating the dissolved rubber by introducing gaseous chlorine into the boiled solution and facilitating the chlorination by exposing the solution to ultra violet radiation.

CLAYTON OLIN NORTH.